United States Patent
Chen et al.

(10) Patent No.: US 8,238,482 B2
(45) Date of Patent: Aug. 7, 2012

(54) TECHNIQUES FOR IMPROVING CHANNEL ESTIMATION AND TRACKING IN A WIRELESS COMMUNICATION SYSTEM

(75) Inventors: Ning Chen, Austin, TX (US); Ahsan U. Aziz, Austin, TX (US); Leo G. Dehner, Austin, TX (US); Taeyoon Kim, Austin, TX (US)

(73) Assignee: Apple Inc., Cupertino, CA (US)

( * ) Notice: Subject to any disclaimer, the term of this patent is extended or adjusted under 35 U.S.C. 154(b) by 751 days.

(21) Appl. No.: 12/250,613

(22) Filed: Oct. 14, 2008

(65) Prior Publication Data
US 2010/0091826 A1  Apr. 15, 2010

(51) Int. Cl.
*H04L 27/06*  (2006.01)
(52) U.S. Cl. .......... 375/340; 375/316; 375/337
(58) Field of Classification Search ........ 375/340, 375/316, 337
See application file for complete search history.

(56) References Cited

U.S. PATENT DOCUMENTS

| | | | | |
|---|---|---|---|---|
| 7,487,430 | B2* | 2/2009 | Kim et al. | 714/779 |
| 2003/0072395 | A1* | 4/2003 | Jia et al. | 375/341 |
| 2003/0236098 | A1* | 12/2003 | Hayoun | 455/500 |
| 2004/0203702 | A1* | 10/2004 | Burgess et al. | 455/422.1 |
| 2005/0008040 | A1* | 1/2005 | Becker et al. | 370/503 |
| 2005/0272375 | A1* | 12/2005 | Ramesh | 455/67.11 |
| 2009/0196333 | A1* | 8/2009 | Cozzo | 375/225 |

FOREIGN PATENT DOCUMENTS
EP  1221793  4/2007

OTHER PUBLICATIONS

Xiaohong Meng et al., Semi-blind Channel Estimation and Detection Using Superimposed Training, International. Conference Acoustics, Speech, Signal Processing, May 2004, pp. 417-420, vol. 4, Montreal, Canada, IEEE.

* cited by examiner

*Primary Examiner* — Sam K Ahn
*Assistant Examiner* — Leila Malek
(74) *Attorney, Agent, or Firm* — Gazdzinski & Associates, PC (57) ABSTRACT

A technique for performing channel tracking and/or channel estimation in a wireless communication device includes receiving a reference signal and one or more non-error propagation physical channel signals. In general, the one or more non-error propagation physical channel signals must be correctly decoded before a data channel can be decoded. Channel tracking and/or channel estimation are/is then performed based on the reference signal and at least one of the one or more non-error propagation physical channel signals.

22 Claims, 5 Drawing Sheets

TECHNIQUES FOR IMPROVING CHANNEL ESTIMATION AND TRACKING IN A WIRELESS COMMUNICATION SYSTEM

BACKGROUND

1. Field

This disclosure relates generally to channel estimation and, more specifically, to techniques for improving channel estimation and tracking in a wireless communication system.

2. Related Art

As is well known, a wireless channel provides an arbitrary time dispersion, attenuation, and phase shift in a transmitted signal. While the implementation of orthogonal frequency division multiplexing (OFDM) with a cyclic prefix in a wireless communication system mitigates the effect of time dispersion caused by a wireless channel, in order to apply linear modulation schemes it is also usually necessary to remove amplitude and phase shift caused by the wireless channel. Channel estimation is typically implemented in a wireless communication system to provide an estimate (from available pilot information) of an amplitude and phase shift caused by a wireless channel. Equalization may then be employed in the wireless communication system to remove the effect of the wireless channel and facilitate subsequent symbol demodulation. Channel tracking is usually employed to periodically update an initial channel estimation. For example, channel tracking may be employed to facilitate periodic frequency-domain and time-domain channel correlation and periodic updating of channel signal-to-noise ratio (SNR), channel delay spread, and channel Doppler effect.

In a known communication system, a channel coefficient is estimated based on a training signal (pilot) and data is decoded using an estimated channel coefficient. In this system, data is subtracted from a received signal (to reduce interference with the training signal) and the channel estimation is updated based on $y(n)-\hat{x}(n)$, which can be repeated for a number of iterations (where $y(n)$ corresponds to the received signal and $\hat{x}(n)$ corresponds to a reconstructed data signal). In another known communication system, a transmission channel state is obtained from a difference between a received signal and a hard quantized value of a detected signal, which is obtained through an equalizer based on an interpolated channel estimate from scattered reference signals (pilot signals). Unfortunately, in the known communication systems, errors may be propagated as a reconstructed data signal, which is subtracted from a received signal to provide a channel estimation, may be inaccurate.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims and their equivalents. In particular, although the preferred embodiment is described below in conjunction with a subscriber station, such as a cellular handset, it will be appreciated that the present invention is not so limited and may potentially be embodied in various wireless communication devices.

As used herein, the term "channel" includes one or more subcarriers, which may be adjacent or distributed across a frequency band. Moreover, the term "channel" may include an entire system bandwidth or a portion of the entire system bandwidth. As used herein, the term "reference signal" is synonymous with the term "pilot signal." As is also used herein, the term "subscriber station" is synonymous with the term "user equipment," which includes a wireless communication device that may (or may not) be mobile. A reference signal (RS), when received at a subscriber station (SS), is utilized by the SS to perform channel estimation and channel tracking. The disclosed techniques are contemplated to be applicable to systems that employ a wide variety of signaling techniques, e.g., orthogonal frequency division multiplex (OFDM) signaling, single-carrier frequency division multiple access (SC-FDMA) signaling, etc.

In general, accurate channel estimation and tracking is desirable to achieve acceptable performance for SSs in a wireless communication system (e.g., a long-term evolution (LTE) wireless communication system) as downlink (DL) performance is determined by the accuracy of channel estimation and channel tracking. According to various aspects of the present disclosure, one or more non-error propagation physical channels are employed in conjunction with a DL reference signal (DLRS) to improve the accuracy of channel estimation and tracking. In this manner, performance (e.g., block error rate) of a receiver (e.g., an LTE receiver) may be improved. In LTE, an RS is distributed in a subframe and interpolation is used to perform channel estimation for an entire time-frequency grid of an OFDM signal. Unfortunately, employing interpolation may introduce errors in channel estimation.

In the case of an LTE system having a 1.4 MHz system bandwidth, only twelve DLRS sub carriers are currently allocated (in a first symbol of each sub frame) for channel estimation and tracking. According to various aspects of the present disclosure, a number of non-error propagation physical channels may be utilized in conjunction with a DLRS to improve channel estimation and tracking. For example, in an LTE compliant system, the non-error propagation physical channels include: a synchronization channel (SCH), which includes a primary synchronization channel (PSCH) and a secondary synchronization channel (SSCH); a physical broadcast channel (PBCH); and a physical control format indication channel (PCFICH). It should be appreciated that while the discussion herein is directed to an LTE system, the techniques disclosed herein are broadly applicable to improving channel estimation and tracking in any wireless communication system that employs one or more non-error propagation physical channels. As used herein, the term 'non-error propagation physical channel' is a channel that is utilized to transmit call set-up information to an SS. The call set-up channels are generally physical layer control message channels that include DL and uplink (UL) assignments for SSs in a cell. Broadly, non-error propagation physical channels may be thought of as channels that do not include SS data and must be correct for an SS to receive data.

As noted above, in an LTE system, the DLRS is designed for channel estimation and tracking. In general, detection of the SCH (which is typically the most reliable of the physical channels in an LTE compliant system) does not rely on channel estimation. In an LTE compliant system, the PBCH is usually an extremely reliable channel that typically employs a coding rate less than ¼s. According to various aspects of the present disclosure, the PBCH is only utilized for channel estimation and tracking when the PBCH passes a cyclic redundancy check (CRC). In an LTE compliant system, the PCFICH is usually a very reliable channel that typically employs a coding rate of 1/16. In general, if PCFICH fails, an associated subframe fails and, as such, performing channel estimation with a failed PCFICH will not usually worsen receiver performance. In a typical LTE compliant system, the SCH can provide 62×2 additional training pilots every 5 milliseconds, the PBCH can provide 72×4 additional training pilots every 10 milliseconds, and PCFICH can provide 16 more training pilots every 1 milliseconds. According to the present disclosure, one or more of the SCH, PBCH, and PCFICH may be utilized as training pilots (in conjunction with a DLRS) to improve channel estimation/tracking, as the SCH, PBCH, and PCFICH are implemented in such a way that feedback does not cause error propagation.

According to one embodiment of the present disclosure, a technique for performing channel estimation in a wireless communication device includes receiving a reference signal and one or more non-error propagation physical channel signals. Channel estimation is then performed based on the reference signal and at least one of the one or more non-error propagation physical channel signals.

According to another embodiment of the present disclosure, a wireless communication device includes a receiver (e.g., included in a transceiver) and a processor (e.g., a digital signal processor (DSP)) that is coupled to the receiver. The receiver is configured to receive a reference signal and one or more non-error propagation physical channel signals. The processor is coupled to the receiver and is configured to perform channel estimation based on the reference signal and at least one of the one or more non-error propagation physical channel signals. In an LTE compliant system, the one or more nonerror propagation physical channel signals include a synchronization channel signal, a physical broadcast channel signal, and a physical control format indication channel signal, one or more of which may be utilized in conjunction with the reference signal to improve channel estimation and tracking.

According to yet another embodiment of the present disclosure, a technique for performing channel tracking in a wireless communication device includes receiving a reference signal and multiple non-error propagation physical channel signals. Channel tracking is then performed based on the reference signal and at least one of the multiple non-error propagation physical channel signals.

Figure 1:
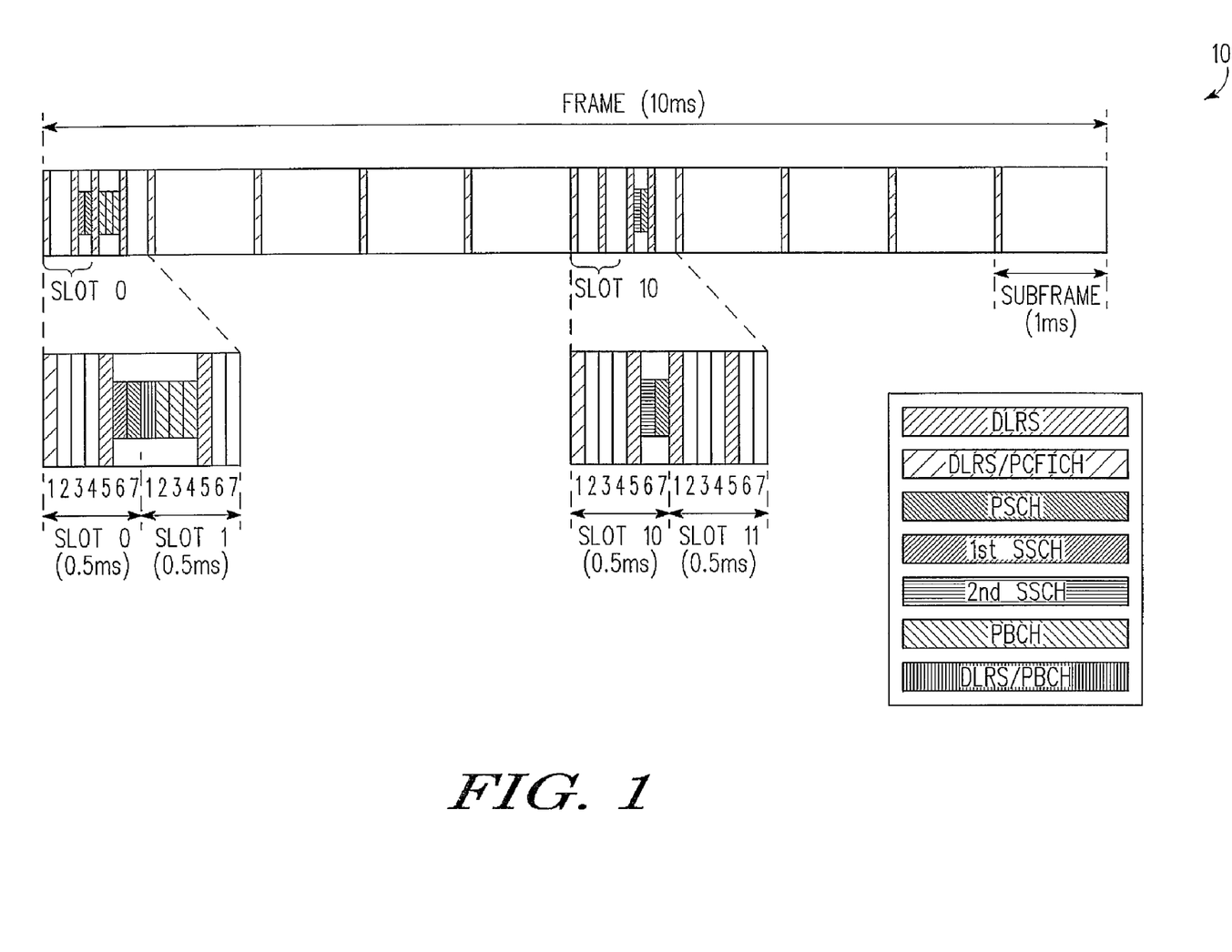
FIG. 1 is a diagram of an example downlink (DL) frame transmitted from a serving base station (BS) in a long-term evolution (LTE) compliant wireless communication system.

With reference to FIG. 1, an example downlink frame 100, which is transmitted from a serving base station (BS) in an LTE compliant system, is illustrated. As is shown, the frame 100 (which is 10 milliseconds in length) includes ten subframes (each of which are 1 millisecond in length). Each of the subframes begins with a DLRS that includes a PCFICH (labeled 'DLRS/PCFICH'). In the illustrated example, a DL subframe includes two slots, each of which include seven long blocks (LBs) which encode a symbol. It should be appreciated that the techniques disclosed herein are broadly applicable to UL subframes that employ more or less than the illustrated number of LBs. With reference to Slot0, a $1^{st}$ SSCH is assigned to LB 6 and a PSCH is assigned to LB 7. With reference to Slot11, a $2^{nd}$ SSCH is assigned to LB 6 and the PSCH is also assigned to LB 7. With reference to Slot1, a PBCH is assigned to LB 1 (labeled 'DLRS/PBCH') and LBs 2-4. While none of the SSCH, PBCH, or PCFICH cover an entire system bandwidth, the channels provide additional information that can be utilized in conjunction with a DLRS to improve channel estimation and tracking.

Figure 2:
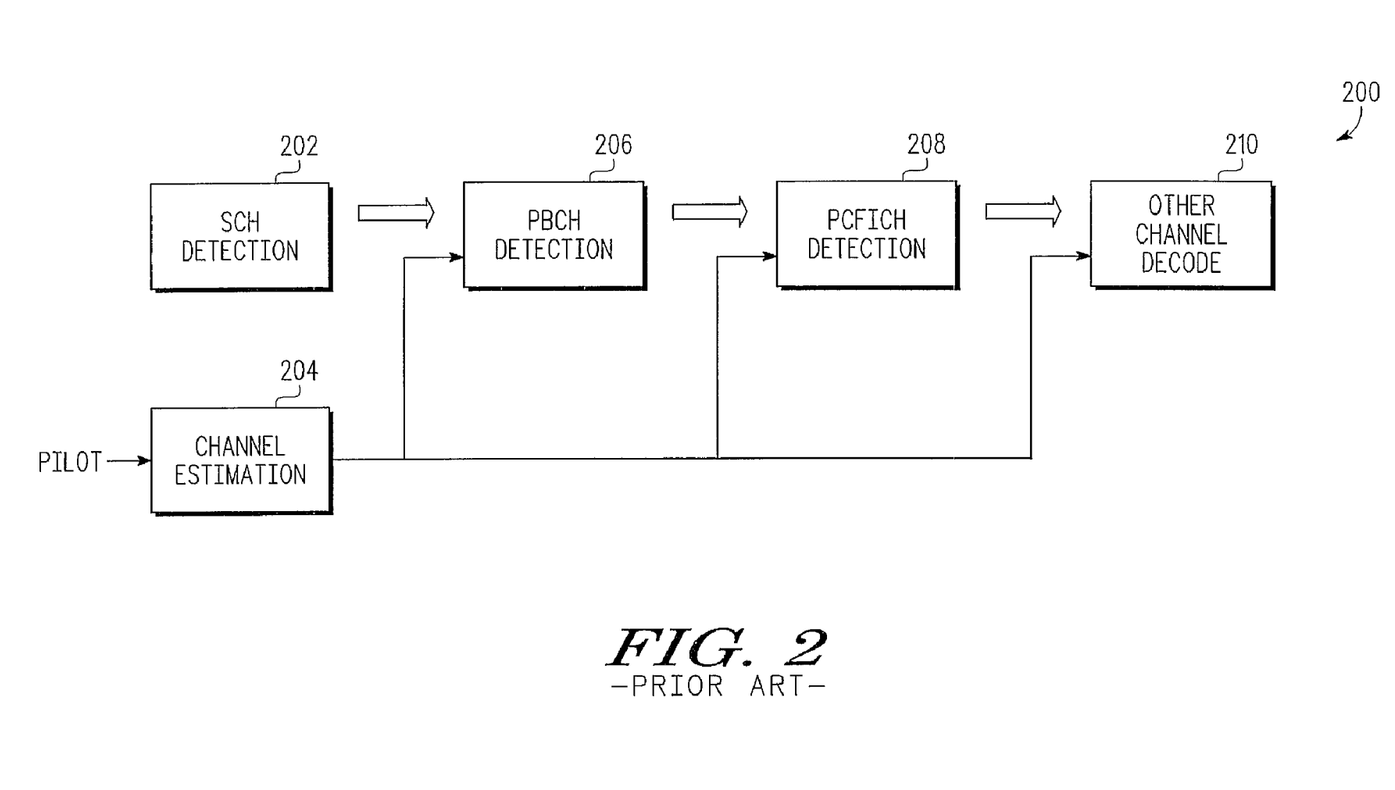
FIG. 2 is an example diagram of a prior art approach for performing channel estimation.

With reference to FIG. 2, an example conventional channel estimation approach 200 is illustrated. As previously noted, wireless devices in conventional communication systems have performed channel estimation based on a pilot signal. The channel estimation has then be utilized to perform PBCH detection 206, PCFICH detection 208, and other channel decoding 210. It should be noted that SCH detection 202 is performed without the benefit of channel estimation 204. In a typical LTE compliant system that is configured according to the prior art, the channel estimation 204 is done in parallel with the SCH detection 202.

Figure 3:
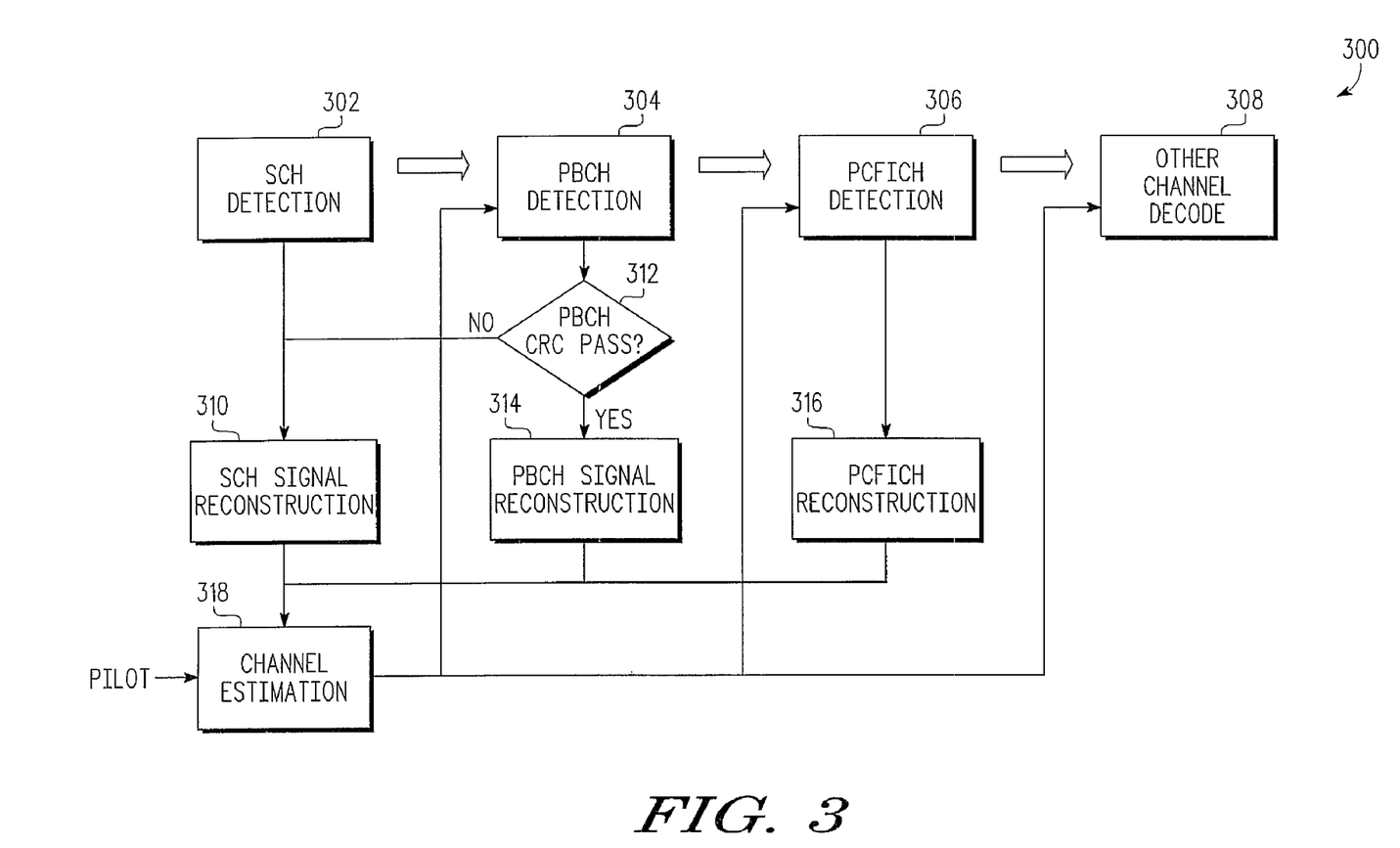
FIG. 3 is an example diagram of an approach for performing channel estimation/tracking according to an embodiment of the present invention.

With reference to FIG. 3, an example channel estimation process 300, according to the present disclosure, is illustrated. The process 300, similar to the approach 200, includes an SCH detection block 302 that performs SCH detection (decoding), without the benefit of channel estimation. However, unlike the approach 200, the process 300 performs an SCH signal reconstruction (using an SCH signal reconstruction block 310, which encodes a decoded SCH signal provided by the block 302). A channel estimation block 318 then performs a channel estimation based on a reference signal (pilot signal) and a reconstructed SCH signal (provided by the SCH signal reconstruction block 310). The channel estimation is then utilized (by a PBCH detection block 304) to perform PBCH detection, utilized (by a PCFICH detection block 306) to perform PCFICH detection, and utilized (using other channel decoding block 308) to perform other channel decoding.

According to one aspect of the present disclosure, when a PBCH signal passes a CRC, PBCH signal reconstruction is initiated by a PBCH signal reconstruction block 314 (which encodes a decoded PBCH signal provided by the block 304), which provides a reconstructed PBCH signal to the channel estimation block 318. The channel estimation may then be performed based on the reference signal, the reconstructed SCH signal (provided by the SCH signal reconstruction block 310), and the reconstructed PBCH signal (provided by the PBCH signal reconstruction block 314).

Similarly, following PCFICH detection (by the PCFICH detection block 306, which decodes the PCFICH signal), a PCFICH reconstruction block 316 provides a reconstructed PCFICH signal (i.e., encodes a decoded PCFICH signal) to the channel estimation block 318. Channel estimation may then be performed by the channel estimation block 318 based on the reference signal, the reconstructed SCH signal (provided by the SCH signal reconstruction block 310), the reconstructed PBCH signal (provided by the PBCH signal reconstruction block 314), and the reconstructed PCFICH signal (provided by the PCFICH reconstruction block 316). When the PBCH does not pass a CRC, PBCH signal reconstruction is not initiated and a reconstructed PBCH signal is not provided to the channel estimation block. It should be appreciated that one or more of the SCH, PBCH, and PCFICH signals may be utilized in conjunction with an RS to provide an improved channel estimation.

Figure 4:
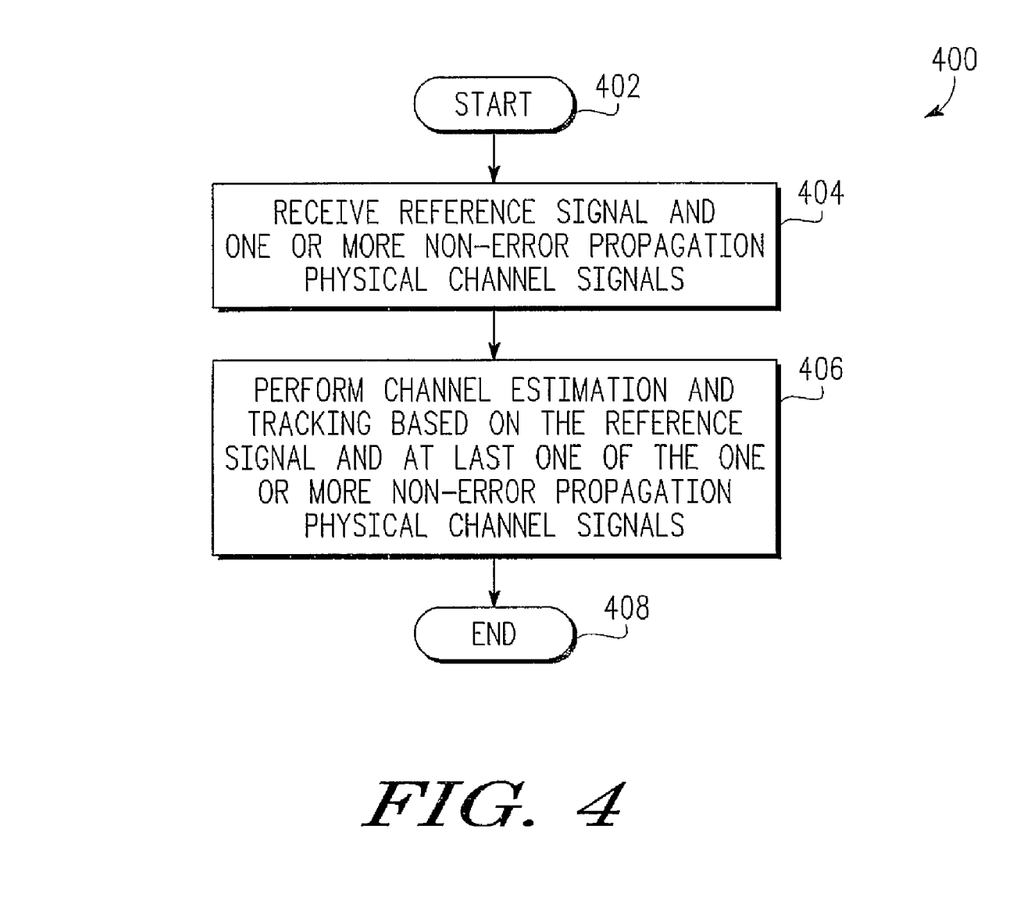
FIG. 4 is a flowchart of an example process for performing channel estimation/tracking according to one aspect of the present invention.

Turning to FIG. 4, a channel estimation and tracking process 400, that may be employed in a SS of a wireless communication system, is depicted. The process 400, which may be utilized to improve channel estimation and tracking, is initiated at block 402, at which point control transfers to block 404. In block 404, a receiver of an SS receives an RS and one or more non-error propagation physical channel signal. Next, in block 406, a processor performs channel estimation (and/or tracking) based on the RS and at least one of the one or more non-error propagation physical channel signals. Next, in block 408, the process 400 terminates and control returns to a calling routine.

Figure 5:
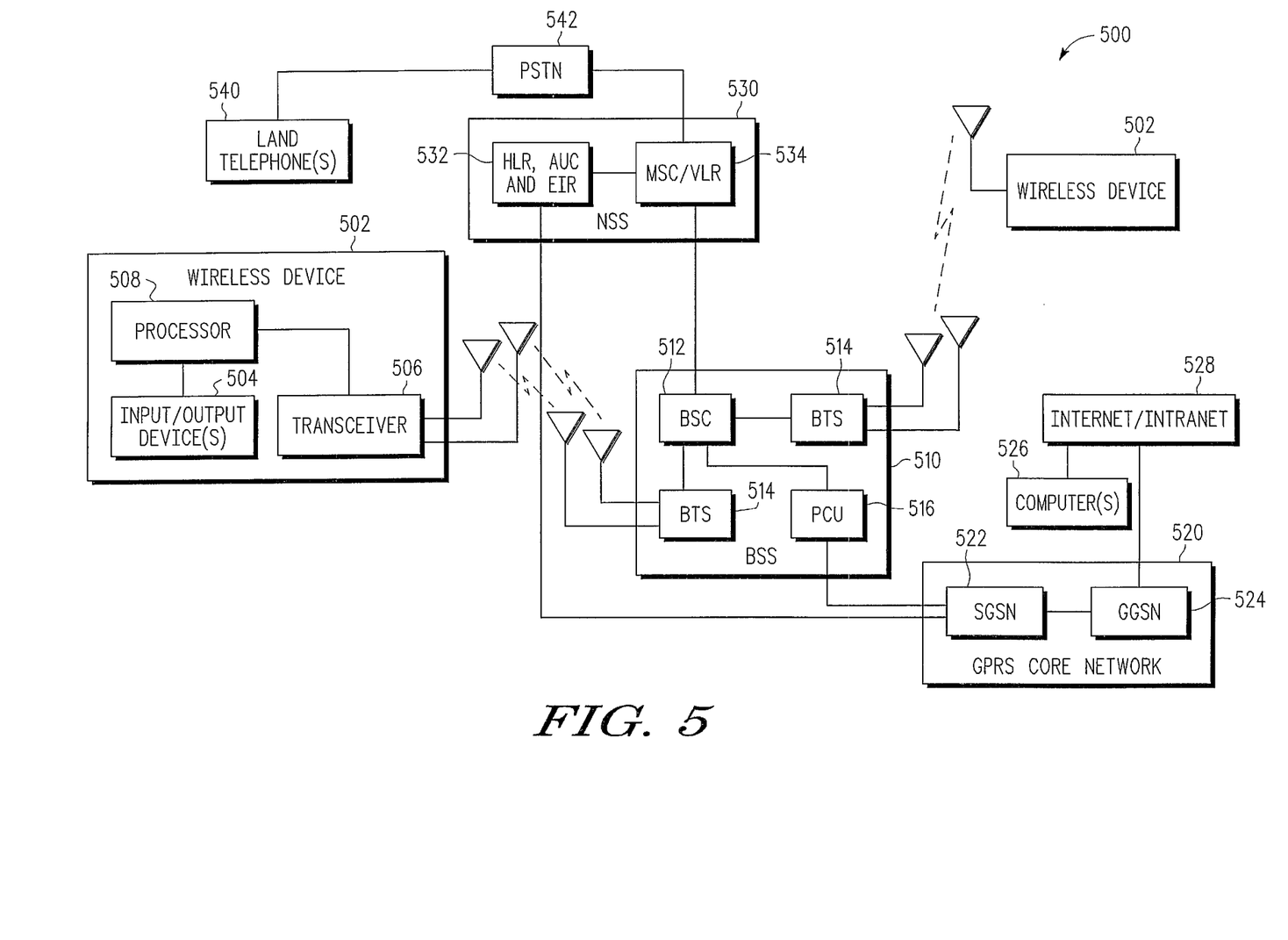
FIG. 5 is a block diagram of an example wireless communication system that includes wireless communication devices that may perform channel estimation/tracking according to various embodiments of the present invention.

With reference to FIG. 5, an example wireless communication system 500 is depicted that includes a plurality of subscriber stations or wireless communication devices 502, e.g., hand-held computers, personal digital assistants (PDAs), cellular telephones, etc., that may perform channel estimation and tracking according to one or more embodiments of the present disclosure. In general, the devices 502 include a processor 508 (e.g., a digital signal processor (DSP)), a transceiver 506, and one or more input/output devices 504 (e.g., a camera, a keypad, display, etc.), among other components not shown in FIG. 5. As is noted above, according to various embodiments of the present disclosure, a technique is disclosed that generally improves channel estimation and tracking. The devices 502 communicate with a base station controller (BSC) 512 of a base station subsystem (BSS) 510, via one or more base transceiver stations (BTS) 514, to receive or transmit voice and/or data and to receive control signals. In general, the BSC 512 may also be configured to choose a modulation and coding scheme (MCS) for each of the devices 502, based on channel conditions.

The BSC 512 is also in communication with a packet control unit (PCU) 516, which is in communication with a serving general packet radio service (GPRS) support node (SGSN) 522. The SGSN 522 is in communication with a gateway GPRS support node (GGSN) 524, both of which are included within a GPRS core network 520. The GGSN 524 provides access to computer(s) 526 coupled to Internet/intranet 528. In this manner, the devices 502 may receive data from and/or transmit data to computers coupled to the Internet/intranet 528. For example, when the devices 502 include a camera, images may be transferred to a computer 526 coupled to the Internet/intranet 528 or to another one of the devices 502. The BSC 512 is also in communication with a mobile switching center/visitor location register (MSC/VLR) 534, which is in communication with a home location register (HLR), an authentication center (AUC), and an equipment identity register (EIR) 532. In a typical implementation, the MSC/VLR 534 and the HLR, AUC, and EIR 532 are located within a network and switching subsystem (NSS) 530, which performs various functions for the system 500. The SGSN 522 may communicate directly with the HLR, AUC, and EIR 532. As is also shown, the MSC/VLR 534 is in communication with a public switched telephone network (PSTN) 542, which facilitates communication between wireless devices 502 and land telephone(s) 540.

As used herein, a software system can include one or more objects, agents, threads, subroutines, separate software applications, two or more lines of code or other suitable software structures operating in one or more separate software applications, on one or more different processors, or other suitable software architectures.

As will be appreciated, the processes in preferred embodiments of the present invention may be implemented using any combination of computer programming software, firmware or hardware. As a preparatory step to practicing the invention in software, the computer programming code (whether software or firmware) according to a preferred embodiment will typically be stored in one or more machine readable storage mediums such as fixed (hard) drives, diskettes, optical disks, magnetic tape, semiconductor memories such as read-only memories (ROMs), programmable ROMs (PROMs), etc., thereby making an article of manufacture in accordance with the invention. The article of manufacture containing the computer programming code is used by either executing the code directly from the storage device, by copying the code from the storage device into another storage device such as a hard disk, random access memory (RAM), etc., or by transmitting the code for remote execution. The method form of the invention may be practiced by combining one or more machine-readable storage devices containing the code according to the present invention with appropriate standard computer hardware to execute the code contained therein. An apparatus for practicing the invention could be one or more computers and storage systems containing or having network access to computer program(s) coded in accordance with the invention.

Although the invention is described herein with reference to specific embodiments, various modifications and changes can be made without departing from the scope of the present invention as set forth in the claims below. For example, many of the techniques disclosed herein are broadly applicable to a wide variety of wireless communication systems. Accordingly, the specification and figures are to be regarded in an illustrative rather than a restrictive sense, and all such modifications are intended to be included with the scope of the present invention. Any benefits, advantages, or solution to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for operating a first wireless communication device, comprising:
 receiving at the first wireless communication device a reference signal and one or more non-error propagation physical channel signals from a second wireless device over a wireless communication link;
 subsequent to the receiving, detecting the at least one of the one or more non-error propagation physical channel signals to produce at least one detected signal;
 reconstructing the at least one detected signal to produce at least one reconstructed signal; and
 performing channel estimation based on the reference signal and the at least one reconstructed signal;
 wherein:
  the reference signal is received over a channel other than the one or more non-error propagation physical channel; and
  the one or more non-error propagation physical channel signals includes a physical broadcast channel signal that is only used for said performing channel estimation when the physical broadcast channel signal passes a cyclic redundancy check.

2. A method for operating a first wireless communication device, comprising:

receiving at the first wireless communication device a reference signal and one or more non-error propagation physical channel signals from a second wireless device over a wireless communication link;

subsequent to the receiving, detecting the at least one of the one or more non-error propagation physical channel signals to produce at least one detected signal;

reconstructing the at least one detected signal to produce at least one reconstructed signal; and performing channel estimation based on the reference signal and the at least one reconstructed signal;

wherein:

the reference signal is received over a channel other than the one or more non-error propagation physical channel; and the one or more non-error propagation physical channel signals includes a physical control format indication channel signal.

3. A first wireless communication device, comprising:

a receiver configured to receive a reference signal and one or more non-error propagation physical channel signals from a second wireless device over a wireless communication link; and a processor coupled to the receiver, wherein the processor is configured to perform:

reconstruction of at least one of the one or more non-error propagation physical channel signals to produce at least one reconstructed signal, and channel estimation based on the reference signal and the at least one reconstructed signal;

wherein the one or more non-error propagation physical channel signals includes a physical control format indication channel signal.

4. The wireless communication device of claim 3, wherein the one or more non-error propagation physical channel signals includes two or less of a synchronization channel signal, a physical broadcast channel signal, and a physical control format indication channel signal; and wherein the physical broadcast channel is only utilized in the channel estimation when the physical broadcast signal passes a cyclic redundancy check.

5. A method for operating a first wireless communication device, comprising:

receiving at the first wireless communication device a reference signal and multiple non-error propagation physical channel signals; and performing channel tracking based on the reference signal and at least one of the multiple non-error propagation physical channel signals;

wherein:

the reference signal is received over a channel other than the one or more non-error propagation physical channel; and the multiple non-error propagation physical channel signals includes a synchronization channel signal, a physical broadcast channel signal, and a physical control format indication channel signal.

6. The method of claim 5, wherein the physical broadcast channel is only utilized in the channel estimation when the physical broadcast signal passes a cyclic redundancy check.

7. The method of claim 5, wherein the synchronization channel includes a primary synchronization channel signal and a secondary synchronization channel signal.

8. A method of operating a mobile radio communication device, the method comprising:

receiving at the mobile radio communication device a reference signal and one or more non-error propagation physical channel signals from a base station apparatus over a radio communication link;

subsequent to the receiving the one or more non-error propagation physical channel signals, detecting the at least one of the one or more non-error propagation physical channel signals to produce at least one detected signal;

reconstructing the at least one detected signal to produce at least one reconstructed signal; and performing channel estimation using a first estimation algorithm to obtain the first channel estimate;

wherein the first estimation algorithm is configured to combine the received reference signal with the at least one reconstructed signal to obtain the first channel estimate, the first channel estimate having a reduced error compared to a second channel estimate, the second channel estimate obtained by a second estimation algorithm without utilizing the at least one reconstructed signal and utilizing at least the received reference signal.

9. The method of claim 8, wherein:

the reference signal comprises at least a first pilot signal; and the at least one reconstructed signal comprises at least a second and a third pilot signal, each of said first, second and third pilot signals configured to effect said channel estimation.

10. The method of claim 9, wherein receiving at least one of the reference signal or one or more non-error propagation physical channel signals comprises receiving a subframe comprising a plurality of Orthogonal Frequency-Division Multiplexing (OFDM) symbols.

11. The method of claim 10, wherein at least one of the plurality of OFDM symbols comprises two or more frequency subcarriers distributed within a frequency band.

12. The method of claim 10, wherein at least one of the plurality of OFDM symbols comprises two or more subcarriers, disposed adjacent to one another within a frequency band.

13. The method of claim 10, wherein:

at least one of the plurality of OFDM symbols comprises two or more frequency subcarriers; and the reference signal comprises downlink reference signal, comprising the two or more frequency subcarriers transmitted at the beginning of the subframe.

14. The method of claim 10, wherein:

the subframe comprises a plurality of frequency subcarriers; and the reference signal comprises a downlink reference signal, the downlink reference signal comprising at least a portion of the plurality of frequency subcarriers distributed over at least a portion of the subframe.

15. The method of claim 9, wherein the reference signal comprises a plurality of Orthogonal Frequency-Division Multiplexing (OFDM) symbols, at least a portion of the plurality of OFDM symbols transmitted at the beginning of the subframe.

16. The method of claim 15, wherein at least a portion of the plurality of OFDM symbols is distributed within the subframe.

17. The method of claim 8, wherein the one or more non-error propagation physical channel signals includes a physical broadcast channel (PBCH) signal used in said channel estimation only when the PBCH signal passes a cyclic redundancy check.

18. The method of claim 8, wherein:
   at least one of the one or more non-error propagation physical channel signals comprises a physical broadcast channel; and
   the at least one reconstructed signal is configured to provide a plurality of training pilots to the first estimation algorithm.

19. The method of claim 18, wherein the plurality of training pilots comprises at least 74 pilots provided over a 10-millisecond time interval.

20. The method of claim 8, wherein the at least one reconstructed signal is configured to provide at least 16 training pilots within 1-millisecond time interval to the first estimation algorithm.

21. The method of claim 8, wherein the reference signal is received over a channel other than the one or more non-error propagation physical channel signals.

22. The method of claim 8, wherein the reference signal is received by the mobile radio communications device over a physical data channel.

* * * * *